United States Patent [19]
Hashimoto et al.

[11] Patent Number: 5,836,737
[45] Date of Patent: Nov. 17, 1998

[54] STACKED-CONTAINER SEPARATING APPARATUS AND METHOD

[75] Inventors: Masami Hashimoto, Chiba; Kunio Nishizawa, Tokyo, both of Japan

[73] Assignee: Misuzu Koki Company Limited, Mie-ken, Japan

[21] Appl. No.: 821,775

[22] Filed: Mar. 20, 1997

[30] Foreign Application Priority Data

Nov. 12, 1996 [JP] Japan ................................... 8-315484

[51] Int. Cl.$^6$ ................................................. B65G 59/02
[52] U.S. Cl. .................................. 414/796.4; 414/796.5; 414/413
[58] Field of Search ............................... 414/413, 796.4, 414/796.7, 797.2, 788.5

[56] References Cited

U.S. PATENT DOCUMENTS

| | | | |
|---|---|---|---|
| 2,018,748 | 10/1935 | Thompson | 414/413 |
| 2,804,982 | 9/1957 | Verrinder | 414/413 |
| 3,891,098 | 6/1975 | Koch | 414/796.4 |

FOREIGN PATENT DOCUMENTS

| | | |
|---|---|---|
| 55-119630 | 9/1980 | Japan . |
| 58-100025 | 6/1983 | Japan . |

*Primary Examiner*—Karen M. Young
*Assistant Examiner*—Gregory A. Morse
*Attorney, Agent, or Firm*—Foley & Lardner

[57] ABSTRACT

An apparatus and a method for separating and reversing a stack of containers includes a supply conveyer that supplies the stack of containers, a lifting device that lifts the stack of containers upwards into a separating and reversing device that separates and reverses each of the containers while transporting them downstream. An ejection conveyer positioned at a downstream end of the separating and reversing device ejects each of the separated and reversed containers.

4 Claims, 6 Drawing Sheets

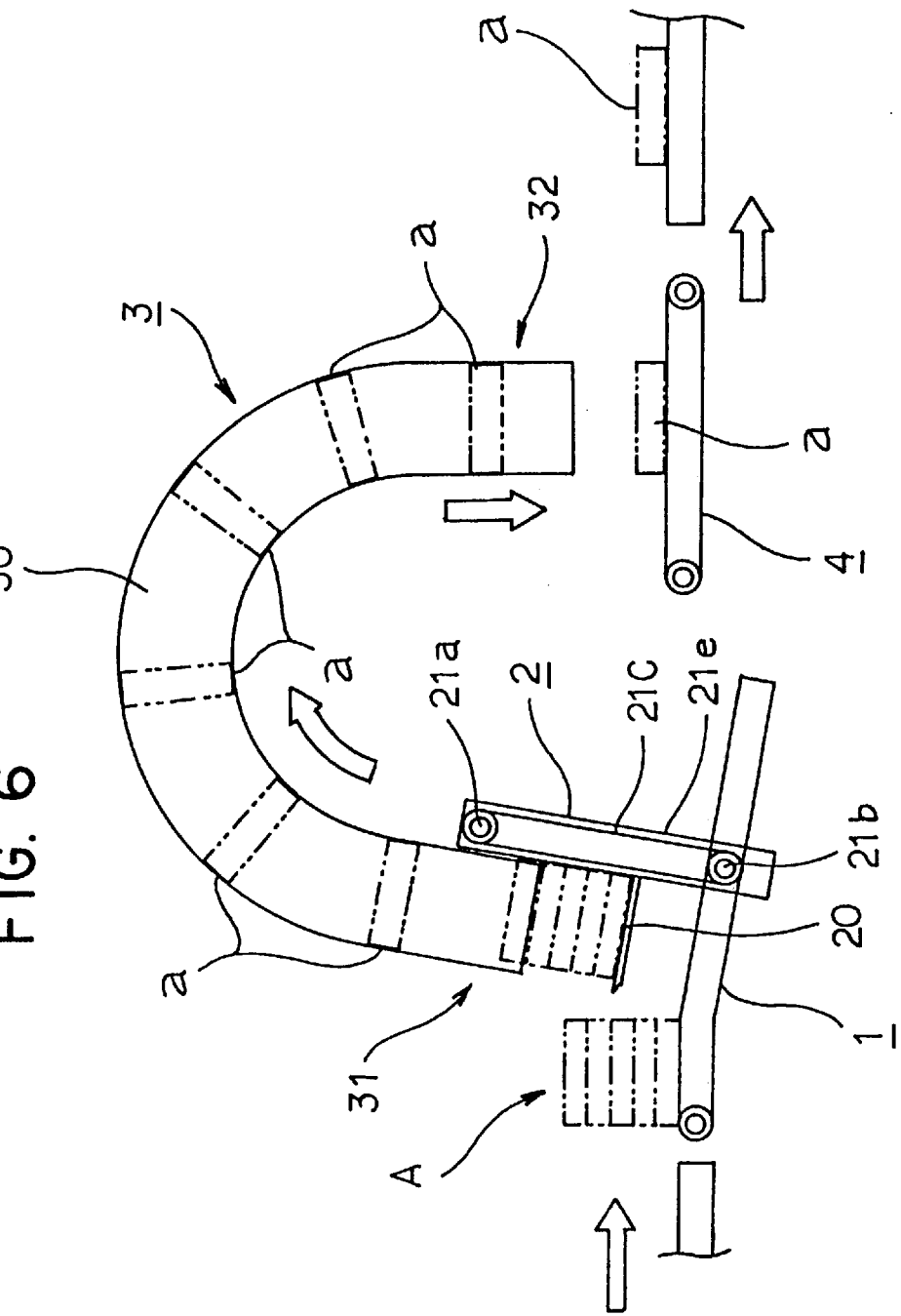

STACKED-CONTAINER SEPARATING APPARATUS AND METHOD

BACKGROUND OF THE INVENTION

1. Field of the Invention

This invention relates to a stacked-container separating apparatus and a method for separating stacked containers to separately dispose the containers.

2. Description of the Related Art

An example of such a stacked-container separating apparatus or method of the prior art is disclosed in Japanese Patent Application Laid-Open Publication No. 55-119630, in which the stacked-container separating apparatus comprises a stack separating device for releasing engaged items to be transferred sequentially one by one from the bottom thereof while engaging the items in a stacked condition, an ejecting conveyer for sequentially ejecting the separated item in a separated condition from the stack separating device, a sliding device for advancing these items to be transferred in the stacked condition from these items being driven by a motor via a crank mechanism.

Japanese Patent Application Laid-Open Publication No. 58-100025 discloses a stacker and stack-separating apparatus which is operatively provided with two types of nails; nail A and B at the left and right ends to allow to stacking of the containers or to separate stacked containers respectively.

In such a prior art stacked-container separating apparatus, it is common to handle these stacked containers by dropping them downwards vertically one by one.

The stacked-container separating apparatus and methods in the prior art separate the stacked containers one by one, and then turn them upside down before each of the separated containers are transferred to a washing machine. It is, therefore, required to provide an additional device for reversing each of the containers.

Specifically, a problem with such container-wash-line, which require to process a large number of containers, such as more than 2,000 containers per hour, is that a reversing operation for the containers has to be included. However, in view of the large number of containers, it is difficult to realize such a reversing operation.

Furthermore, another problem is the degradation of the working environment which worsens the working efficiency since the operation to reverse the containers requires the use of a plurality of air pressure cylinders, for example. This causes increased noise due to the operation of air pressure cylinders and by dropping the containers during the reversing operation.

Another problem with the prior art is that it easily produces deformations or damages to the containers during the reversing operation. The prior art also gives rise to other container related defects, such as the wear and tear of accessories of the containers.

SUMMARY OF THE INVENTION

Therefore, it is a general object of the invention to alleviate the problems and shortcomings identified above.

Another object of the invention is to provide a stacked-container separating apparatus which comprises: a supply conveyer for supplying stacked containers; a lifting device for lifting the whole stack of containers upward, which are then carried to a downstream end of the supply conveyer; a separating and reversing (or inverting) device having an upstream end positioned upward of the lifting device for separating and reversing each of the containers while transporting them respectively; and an ejection conveyer positioned downward of a downstream end of the separating and reversing device for ejecting each of the containers.

Another object of the invention is to provide a stacked-container separating apparatus which comprises: a supply conveyer for supplying stacked containers; a lifting device for lifting all the stacked containers upward, which are then automatically carried to a downstream end of the supply conveyer; a separating and reversing device having the shape of a letter U when viewed from a side of the device, and having an upstream end positioned upward of the lifting device for reversing the containers while transporting by holding them between the left and right sides of the containers; and an ejection conveyer having an upstream end positioned downward of the downstream end of the separating and reversing device for ejecting the containers.

A further object of the invention is to provide a method for separating stacked containers, the method comprising: transporting a whole set of stacked containers formed by stacking a plurality of containers to a lifting device by a supply conveyer that supplies the stacked containers; lifting upward by the lifting device; nipping at both sides of a container that is located at the top of the stacked containers by a separating and reversing device which has an upstream end located upward of the lifting device; separating each of the stacked containers respectively, reversing each of the containers while transporting the block of containers; and mounting each of the reversed containers sequentially onto an ejecting conveyer.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 6 shows a transfer, stack separating and reversing operations for the stacked and subsequently separated containers.

DETAILED DESCRIPTION OF THE PREFERRED EMBODIMENTS

Figure 1:
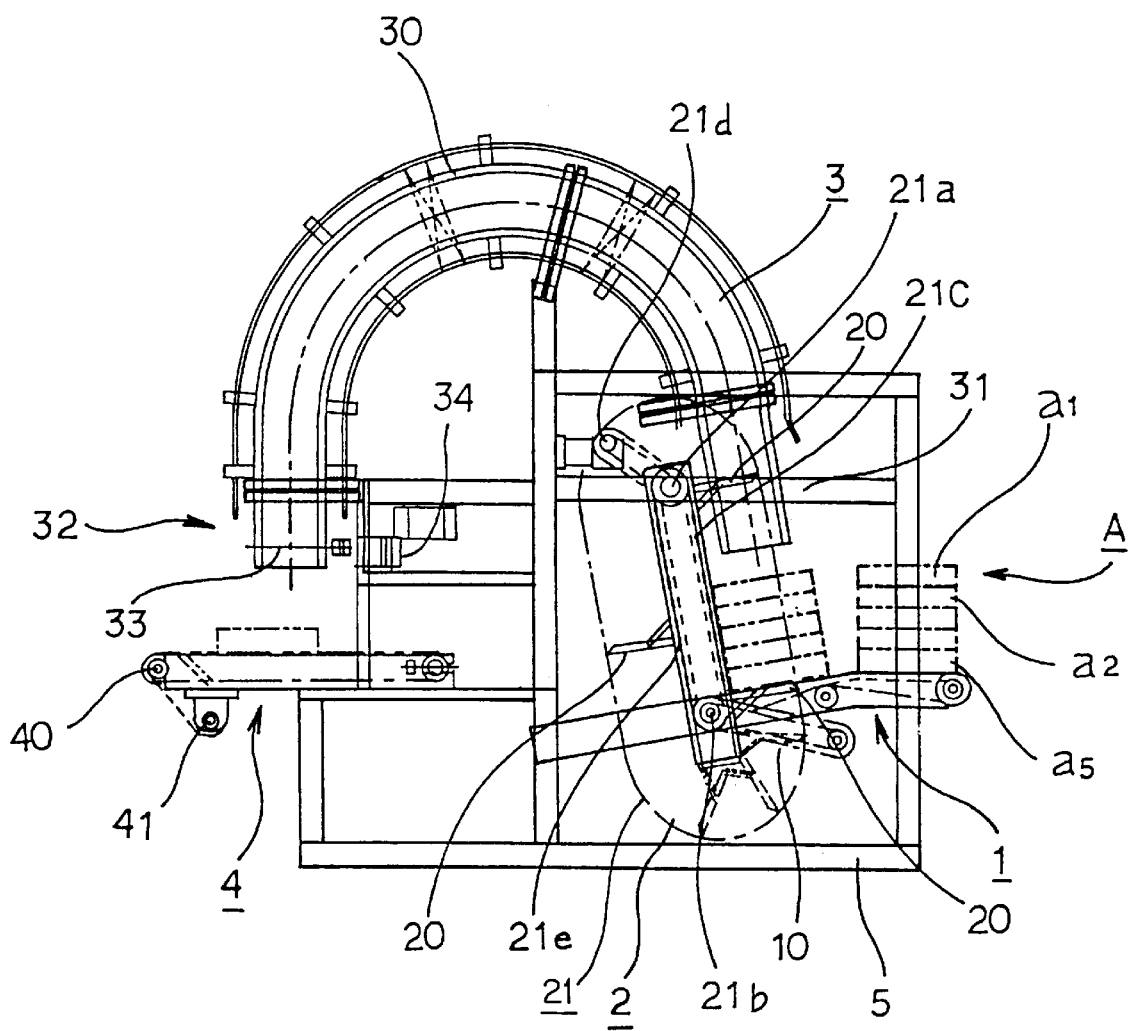
FIG. 1 shows a front view of a stacked-container separating apparatus.
Figure 2:
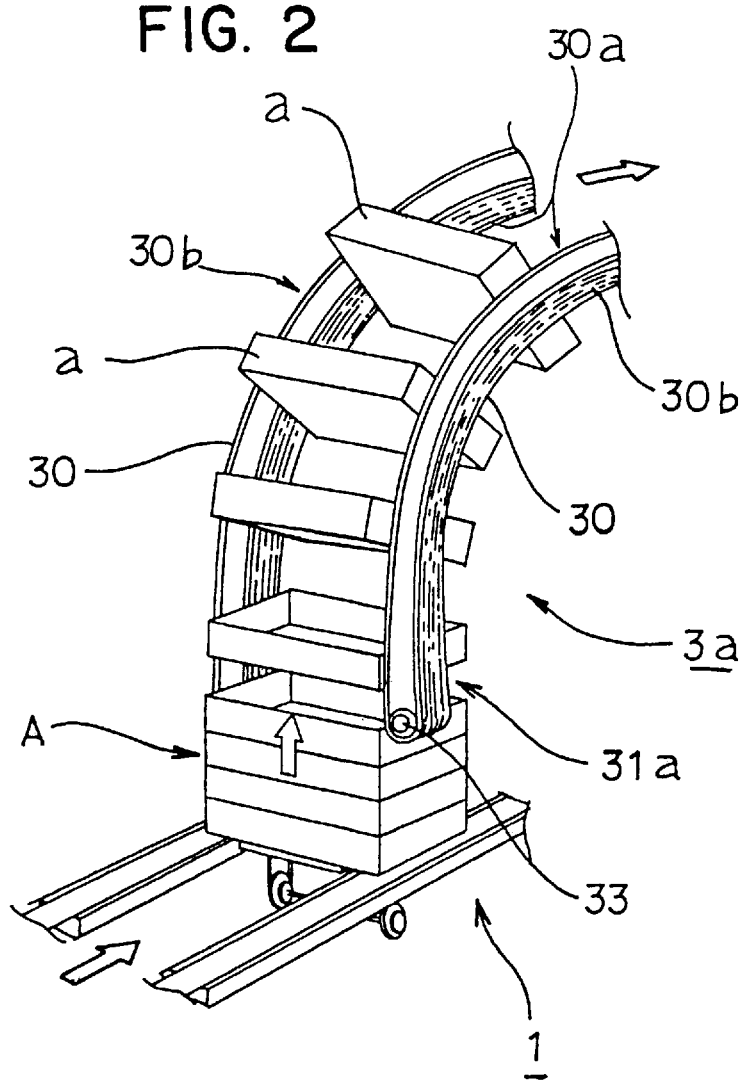
FIG. 2 shows a perspective view of stacked containers "A" being transferred from a supply conveyer for the stacked containers via a lifting device to a separating and reversing device according to a first embodiment of the present invention.
Figure 3:
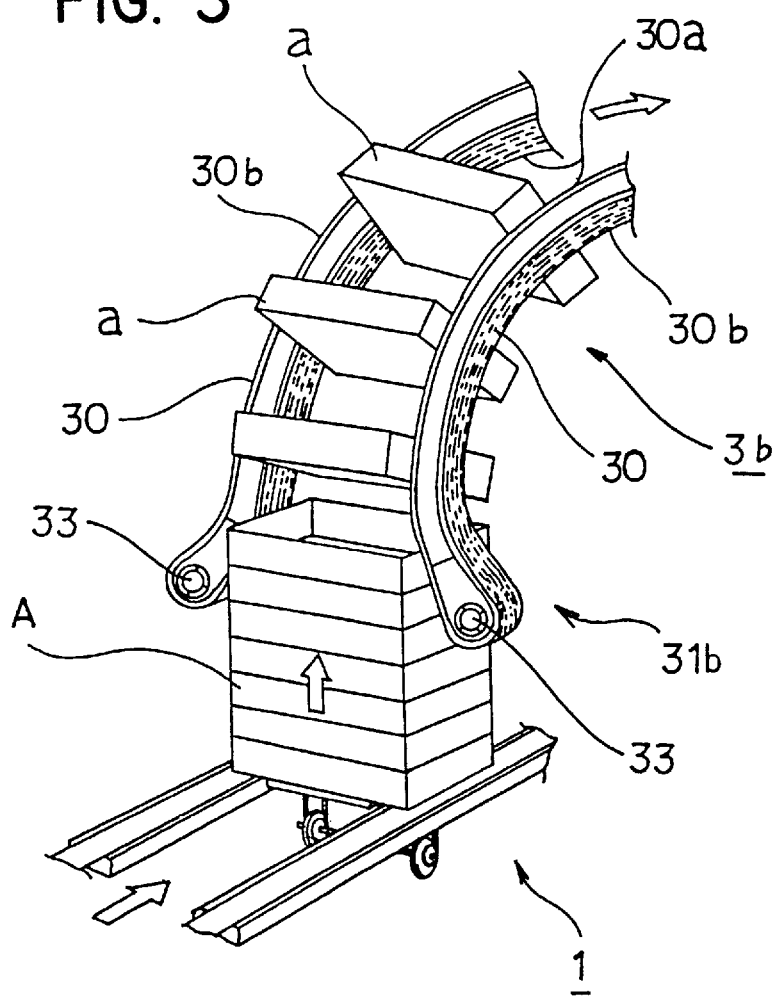
FIG. 3 shows a perspective view of stacked containers "A" being transferred from a supply conveyer for the stacked containers via a lifting device to a separating and reversing device according to a second embodiment of the present invention.
Figure 4:
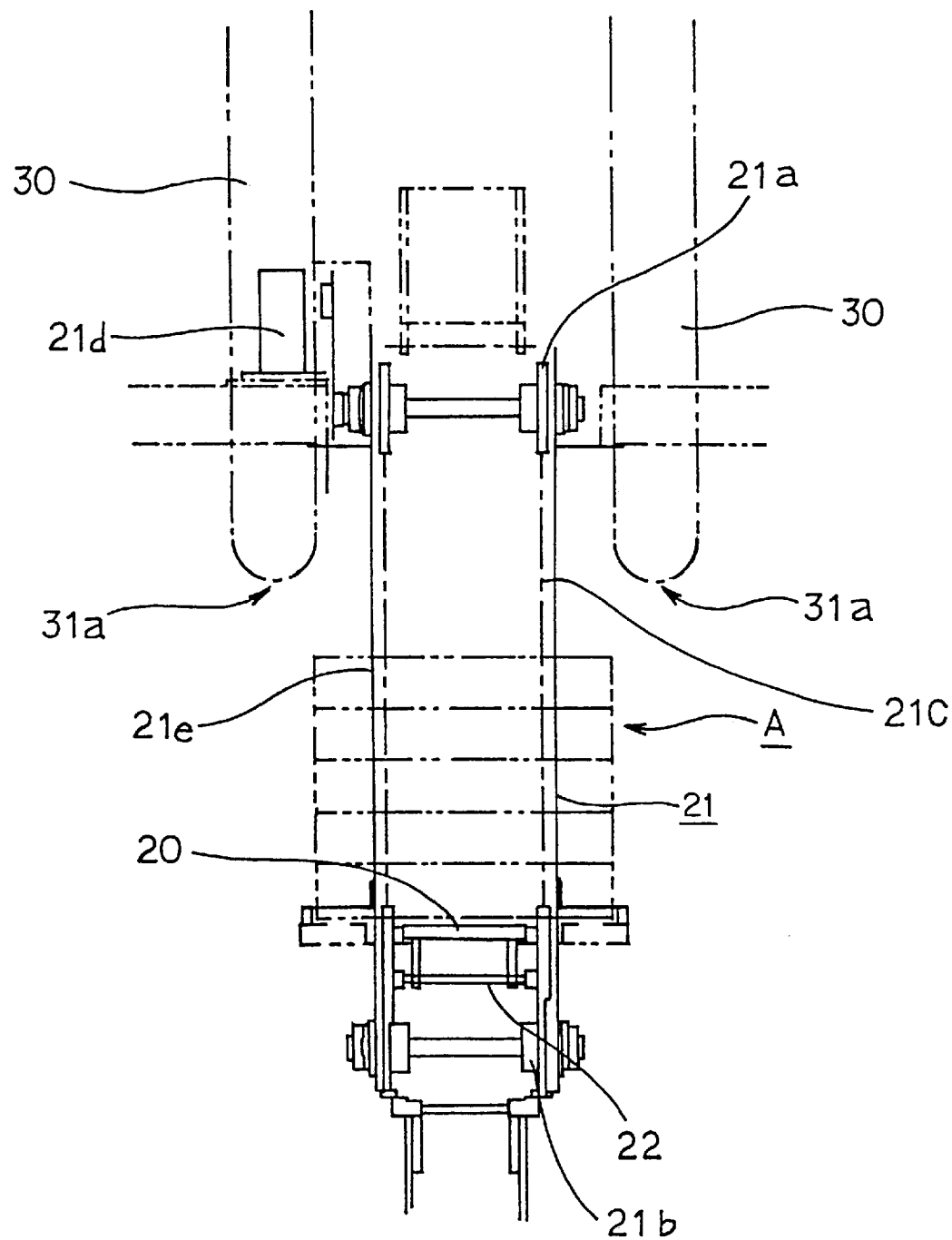
FIG. 4 shows a partially enlarged side view of the stacked-container separating apparatus.
Figure 5:
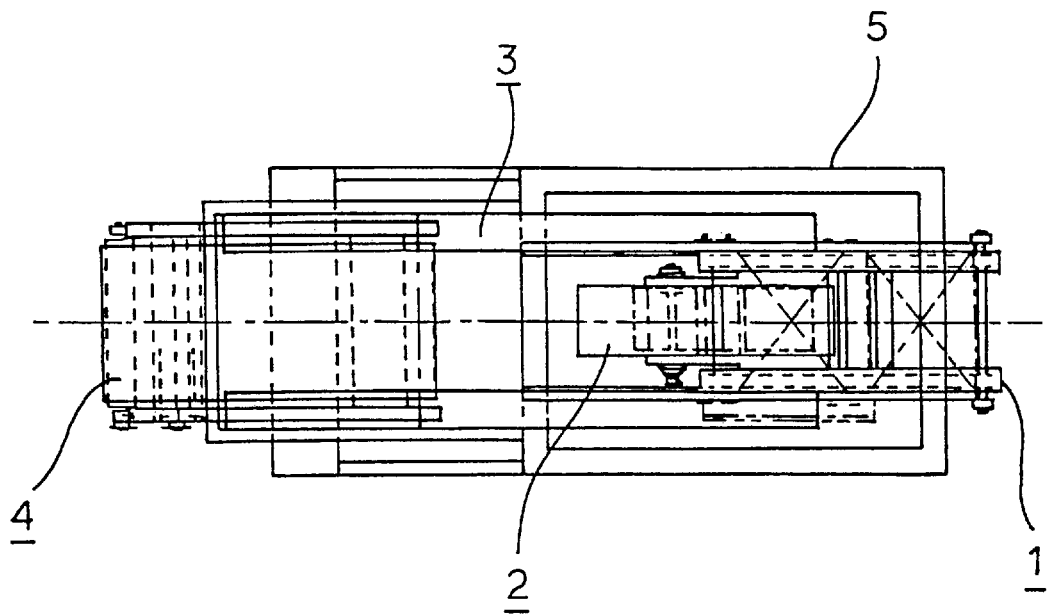
FIG. 5 shows a plan view of the stacked-container separating apparatus a front view of an stack-separating device of the present invention.

Description of the preferred embodiments will be made with reference to the figures in which FIG. 1 shows a front view of an stacked-container separating apparatus of the invention. FIG. 2 shows a perspective view of one embodiment of the transfer of stacked containers from a supply conveyer and a lifting device to a separating and reversing device, while FIG. 3 shows a perspective view of a second embodiment of a transfer of containers from a supply conveyer for stacked containers and a lifting device to a separating and reversing device. FIG. 4 shows a side view of the stacking apparatus while FIG. 5 shows a plan view of the stacked-container separating apparatus shown in FIG. 1. FIG. 6 illustrates the transfer, stack separating and reversing operations for the stacked container respectively.

Each of containers "a", which are stacked and transferred, may be made of hard plastic material, metallic material etc., and has a planar bottom portion having a rectangular shape and with surrounding side portions. At its top it has an open plane, so that it has a structure suitable for stacking containers ranging from a few to tens of containers in a stack. Each of the containers can be transferred with food items, such as bread, being placed on the bottom portion of the container "a".

The containers "a" are vertically stacked together to form layers of stacked containers "A" in preparation for washing after use. According to one embodiment of the present invention, five containers "a" are stacked to form a block of stacked containers "A".

FIG. 1 shows a supply conveyer 1 for the stacked containers, a lifting device 2, a container separating and reversing device 3, and an ejecting conveyer 4 for ejecting a separated container are attached to a frame 5 respectively. The supply conveyer 1 has a pair of endless conveyers, such as belt conveyers, chain conveyers, or link conveyers positioned apart respectively at left and right ends of the supply conveyer, and transfers the stacked container "A" from the upstream end to the downstream end of the conveyer 1.

According to the present invention, the supply conveyer 1 has, for example, a length of approximately one thousand and two hundred millimeters, and is supplied with the stacked containers "A" from the upstream side of the supply conveyer (not shown in the FIGURE). The conveyer 1 is horizontally positioned from its upstream portion to its middle portion, and is positioned with slightly downward inclination from the middle portion to a downstream end 10 of the conveyer 1.

The lifting device 2 is positioned at the downstream end of the supply conveyer 1, and has an endless chain link device 21 which stands between the left and right sides of the conveyer 1 facing approximately toward downstream side of the supply conveyer 1. Lifting plates 20 which are attached to and between the left and right endless of the chain link device 21 and a horizontal shaft 22. The chain link device 21 has a driving sprocket 21a at its top, a follower sprocket 21b at its bottom, and provides an endless chain 21c between the driving sprocket 21a and the follower sprocket 21b. The driving sprocket 21a is connected to the driving motor 21d using a sprocket and an endless chain. A chain guide has a planar body provided outside of the endless chain 21c, as shown in the figures by 21e.

Lifting plates 20, which are provided between the endless chains 21c, are driven to rotate for feeding and lifting, and are made of metal planar body supported by the horizontal shaft 22, and each of the plates are lifted while the lifting plates 20 are extended horizontally toward the supply conveyer 1. Sets of the plates 20 and the horizontal shafts 22 are attached to the endless chains with substantially the same distance between the sets. The distance between the sets may be changed or adjusted in response to the height of the block of the stacked containers "A". According to one embodiment of the present invention, three sets of the lifting plates and the horizontal shafts are provided, which are able to handle five to seven stacked containers.

In another embodiment, instead of stack-separating of the lifting plates 20 of the lifting device 2, a plurality of lifting shafts may be attached to the horizontal shaft 22 which is positioned inside of the endless chain 21c, and may horizontally and orthogonally extended to and from the shaft 22, to produce a similar effect as described above.

The lifting device 2 lifts the stacked containers "A" from bottom thereof as they arrive supplied by the supply conveyer 1, and put them on the lifting plate 20 to lift the containers "A". The lifting plate 20 then operates to repeatedly ascend and descend driven by the endless chain 21, with the ascent of the plate 20 taking place on the side of the supply conveyer 1.

The container separating and reversing device 3 has a pair of vertical type curved conveyers 30 which have an inverted U shapes when viewed from the front, and which are positioned parallel each other at the left and right sides of the device 3. The upper end 31 of the conveyers 30 are positioned upward of the lifting device 2, and the downstream end 32 of the conveyers 30 are positioned upward of the upstream end of the ejection conveyer 4. The left and right curved conveyers 30 are movably provided within the frame 5 so that the distance between them is adjustable. According to another embodiment, the distance of the left and right conveyers 30 can be fixedly mounted on the frame 5. The driving sprocket, which is a rotating portion 33 of the downstream end of the conveyers 30, is connected to a driving motor 34.

Each of the curved conveyers 30 of the separating and reversing device 3, comprises a plastic belt having a number of small protrusions thereon, and an endless belt conveyer such as a friction-link type of a high frictional force, and has the belt conveyer-plane facing the side of the conveyers 30. The left and right curved conveyers 30 are movably provided so that the distance between them can be adjusted to meet the width of the containers "A." Therefore, both of the conveyers are arranged in parallel with a distance slightly narrower than the width of the container which is to be nipped between the conveyers 30. According to one embodiment, this adjustment is done by moving only one of the curved conveyers 30. Each of these conveyers has a sprocket or gear provided at the upstream and downstream ends for endlessly driving the conveyors, and each of belt planes of the conveyers face each other and provide an inner surface 30a which is moving from the upstream to the downstream end of the conveyers, and the surface of the other side of each of the conveyers 30 forms an outer back plane 30b.

In the first embodiment shown in FIG. 2, the upstream end 31a of the container separating and reversing device 3a maintains the distance between the parallel curved conveyers 30.

In the second embodiment shown in FIG. 3, the upstream end 31b of the container separating and reversing device 3b has a distance between the left and right curved conveyers 30, shaped like an inverted "V" with its apex open, when viewed from its upstream frontal position. The distance gradually increases toward the end of the conveyers 30 from the other central positions of the conveyers 30.

The distance of the curved conveyers 30 can be adjusted to the width of the container A, and in one embodiment it is set slightly narrower than the width of the container A to be transferred.

Each of the conveyers 30 has the rotating portion 33 comprising, for example, a sprocket or gear at the downstream end 32, and the rotational portion 33 operates endlessly driven by the driving motor 34. Both of the left and right curved conveyers 30 run at same velocity by the common driving motor 34.

The container ejection conveyer 4 is an endless conveyer, such as a belt conveyer, chain conveyer, link conveyer and the like, and driven by a driving sprocket 40 positioned downstream of the conveyer. The driving sprocket 40 is connected to a motor 41 for driving the container ejection conveyer 4. The ejection conveyer 4 is positioned at the downstream end 32 of the separating and reversing device 3, and used for transferring the containers "a", which are separated and dropped by and from the downstream end of the separating and reversing device 3.

The operation of an embodiment of the stacked-container separating apparatus and method according this invention is described next. The distance between the curved conveyers 30 of the separating and reversing device 3 is pre-adjusted to the width of the container "a" so that the distance is slightly smaller than the width of the container "a". A set of the containers "A", formed by stacking a plurality of the vacant containers, for example in this embodiment, by stacking five vacant containers, is transferred to the lifting device 2 via the supply conveyer 1.

In the supply conveyer 1, the portion from its mid portion to the downstream end 10 is formed such that it is slightly bent downward, that is, bent downward at the frontal position of the endless chain link device 21 of the lifting device 2. Thus when the stacked containers "A" touch the chain guide 21d, it is lifted upward by the lifting plate 20 which is moving upward. The velocity of the chain link device 21 and lifting plate 20 of the lifting device 2 is set lower than the velocity of the curved conveyers 30 of the separating and reversing device.

When the stacked containers "A" are lifted upward, the top container "a1" of the containers reaches a position between the left and right curved conveyers 30 at the upstream end 31 of the separating and reversing device 3. According to the first embodiment of the invention, the upstream end 31a of the conveyers 30 has a gap which extends in parallel so that only the top of containers a1 is captured between the conveyers 30 running endlessly and transported to the down stream end 32.

According to second embodiment of the invention, the upstream end 31b of the conveyer 30 of a container separating and reversing device 3b has a gap which widens increasingly in the shape of an inverted "V," or like an unfolded fan so that only the top container a1 is easily captured between the conveyers 30 and transferred to the downstream end 32. The lifting plate 20 of the lifting device 2 moves upward so that the containers a2, a3, a4 and a5, are sequentially separated at a similar pace from the top of the containers "A", when they reach the top of the containers "A," and are captured between the left and right curved conveyers 30 to be transferred towards the downstream end 32.

These separated containers a1–a5 are respectively reversed with regard to the upper and lower planes of the container while the containers are transported by the conveyers 30 of the separating and reversing device 3, and fall naturally from the downstream end 32 onto the upstream end of the container ejection conveyer 4. Each of the containers "a" is thus automatically reversed while being transferred by the conveyers 30. The ejection conveyer 4 then transfers sequentially each of the containers one by one.

The present invention is thus able to sequentially separate and reverse each of the stacked containers, so that it result in separating and reversing a large number of containers, for example, up to approximately 2,000 containers per hour.

The present invention is thus able to improve working environment since it does not require any specific or separate stack reversing device, and, therefore does not produce any significant noise during reversing of the containers, or due to air cylinders. Further, the present invention avoids deformation due to the container reversing operation, and other damage such as defects or deterioration due to wear and tear of accessories of the containers.

Other embodiments of the invention will be apparent to those skilled in the art from a consideration of the specification and practice of the invention disclosed herein. It is intended that the specification be considered as exemplary only, with the true scope and spirit of the invention being indicated by the following claims.

What is claimed is:

1. A stack-separating equipment comprising:

a supply conveyer for supplying a stack of containers;

a lifting device for lifting the stack of containers at a downstream end of said supply conveyer;

a separating and reversing device having an inverted U-shape and, having an upstream end positioned above said lifting device, for reversing each of the containers while transporting them respectively, wherein said separating and reversing device includes two vertical inverted U-shaped conveyers that are parallel to each other; and an ejection conveyer positioned below a downstream end of said separating and reversing device for ejecting each of the containers in a reversed position.

2. A stack-separating equipment according to claim 1, wherein the upstream end of said separating and reversing device has a frontal inverted "V" shape.

3. A stack-separating equipment comprising:

a supply conveyer for supplying a stack of containers;

a lifting device for lifting the stack of containers upward at a downstream end of said supply conveyer;

a separating and reversing device having an inverted U-shape and having an upstream end positioned above said lifting device for reversing while transporting the containers by holding them between the left and right sides of the containers; and an ejection conveyer having an upstream end positioned below the downstream end of said separating and reversing device for ejecting the containers.

4. A stack-separating method comprising:

transporting a set of stacked containers to a lifting device by a supply conveyer that supplies the stacked containers, wherein each of the stacked containers have two sides;

lifting the stacked containers upward by the lifting device;

nipping at both of the two sides of a container that is located at the top position of the stacked containers by a inverted U-shaped container reversing device that has an upstream end located above the lifting device and thereby separating each of the stacked containers respectively;

reversing each of the containers while transporting the containers; and mounting each of the reversed containers onto an ejecting conveyer.

* * * * *